INVENTORS
RENÉ ANXIONNAZ AND
ROGER IMBERT
BY
ATTORNEY

INVENTORS
RENÉ ANXIONNAZ AND
ROGER IMBERT

BY *Arn Holcombe*

ATTORNEY fig. 11 bis

March 19, 1946.   R. ANXIONNAZ ET AL   2,396,911
REACTION PROPELLING DEVICE FOR AIRCRAFT
Filed Nov. 28, 1940   6 Sheets-Sheet 6
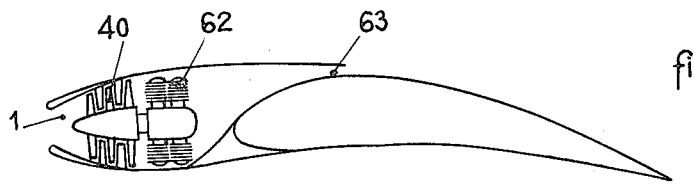
fig. 17
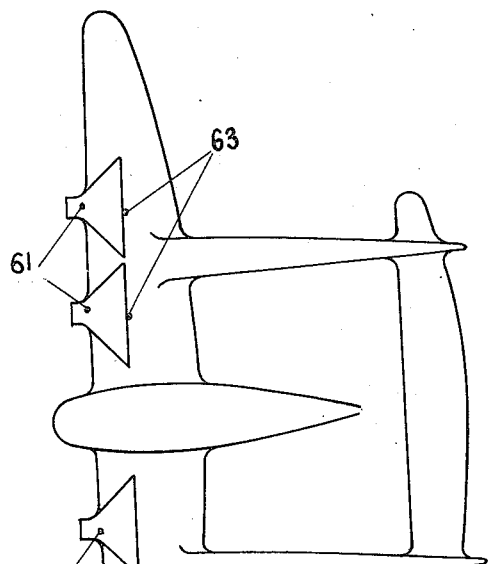
fig. 18
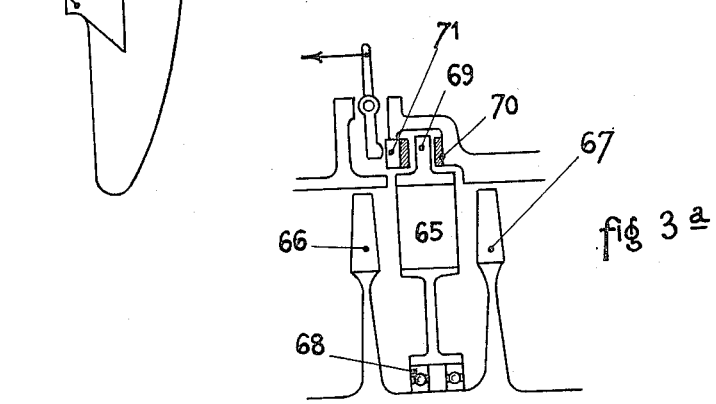
fig 3ª
INVENTORS
RENE ANXIONNAZ
AND ROGER IMBERT
BY
ATTORNEY Patented Mar. 19, 1946

2,396,911

UNITED STATES PATENT OFFICE 2,396,911

REACTION PROPELLING DEVICE FOR AIRCRAFT

René Anxionnaz, Paris, and Roger Imbert, Mantes, France; vested in the Alien Property Custodian Application November 28, 1940, Serial No. 367,666
In France December 4, 1939

4 Claims. (Cl. 60—35.6)

It is known that, in airplanes flying at very high speeds, the tips of the propeller blades should reach a relative velocity with respect to air equal to or higher than velocity of sound at the height that is considered. This produces a considerable increase of the resistance to the movement of said blades, which involves a considerable drop of output, occurring for speeds of the airplane higher than 500 kilometers per hour (which corresponds to a velocity of the blades averaging 300 meters per second), and a practical impossibility for airplanes of a speed higher than 700 kms. per hour.

It should be noted that the same difficulty occurs for the wings of the airplane but only for higher speeds, say 900 or 1000 kms. per hour.

The object of the present invention is to provide a propelling system which overcomes this difficulty for speeds of the airplane higher than 500 kms. per hour.

According to the present invention, we make use of a reaction propelling device in which the driving power is transmitted to air by airscrews or helicoid wheels the relative velocity of which with respect to air never reaches the velocity of sound, this result being obtained by slowing down the flow of air when entering the propelling device and accelerating it as it leaves said propelling device.

Other features of the present invention will result from the following detailed description of some specific embodiments thereof.

Preferred embodiments of the present invention will be hereinafter described, with reference to the accompanying drawings, given merely by way of example, and in which:

Figs. 1 to 8 inclusive and 11 to 16 inclusive show, in diagrammatic section by the vertical plane of symmetry of the airplane various embodiments of the invention, respectively;

Fig. 17 shows the arrangement of the propelling system according to still another embodiment of the invention on an airplane wing;

Fig. 18 is a plan view of an airplane provided with a propelling system according to the invention.

Figure 1:
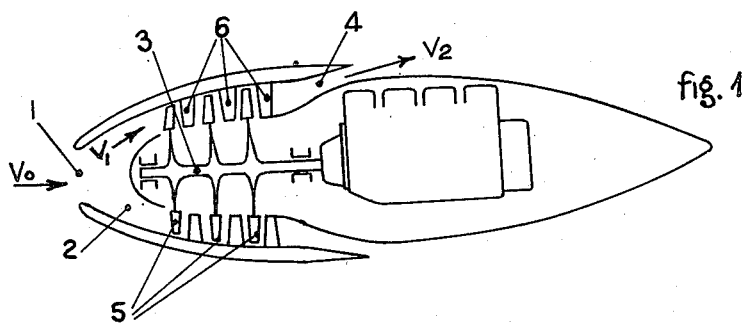
Fig. 1 is intended to illustrate the principle of the invention.

Air from the atmosphere enters the propelling device through orifice 1 with the total relative pressure corresponding to the speed of the airplane. It passes through the divergent nozzle or inlet 2, which has gradually increasing sections and in which the air velocity is gradually reduced, its mean velocity at the rear end of said divergent inlet being $$v_1 = v_0 \times \frac{s_0}{s_1}$$

$s_0$ being the front section and $s_1$ the rear section of the divergent inlet. This divergent inlet can be reduced or even eliminated owing to the use either total or partial of recompression at the front of the fuselage.

After having passed through this divergent inlet, the air comes to compressor 3. On the drawing, this propelling compressor is of the multicellular type, with helicoid blades 5 and stationary blades 6. But this compressor may be of the mono-cellular helicoid type, or even constituted by an airscrew, according to the particular conditions of velocity and power to be obtained.

When issuing from the propeller or compressor, the air still moves with an axial velocity approximating $v_1$, but it has been given a pressure higher than that it has at the inlet. This air is then expanded in a nozzle 4, in which it is given a velocity $v_2$ higher than the velocity $v_0$ of the airplane, and through the exhaust of this air into the atmosphere, the system is given a frontward impulse proportional to the mass of the air in movement and the difference between the velocities $v_2$ and $v_0$.

This impulse or forward thrust replaces the action of the airscrew of an ordinary airplane and ensures the propulsion of the whole.

It will be seen that, by choosing the sections $s_0$ and $s_1$ of the divergent inlet and by taking for the propeller or compressor a sufficiently low peripheral velocity, it is possible to bring back the relative velocity of air with respect to the driving blades to a value which can be chosen in advance. In particular, this relative velocity can be chosen lower than the velocity of sound or a given fraction of this velocity even if velocity $v_0$ is itself higher than this value and a fortiori the whole range of problems in which, $v_0$ being lower than the velocity of sound, it is impossible to provide an airscrew having a good efficiency and the relative velocity of which at the ends of the blades is sufficiently below this velocity of sound.

As the velocity of sound in air increases with the temperature thereof and the compression produced by each wheel causes a heating of the air, it will be seen that the critical velocity of the air will be higher after its passage through the first wheel than before.

Therefore, it will be possible to make use for the second wheel of a peripheral velocity slightly higher than the first, which permits of making this second wheel of a slightly greater diameter, and so on for the successive wheels.

Figure 2:
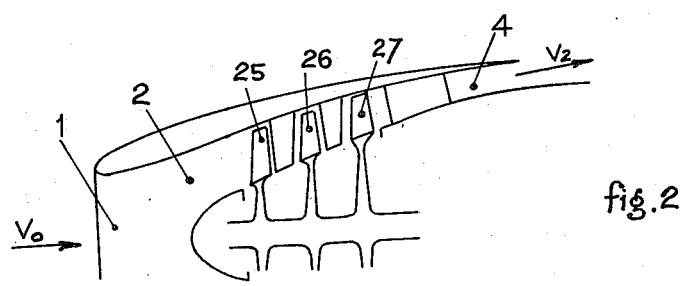

Fig. 2 shows a propeller made according to this arrangement, in which the diameters of the successive wheels 25, 26 and 27 are increased from one to the next one.

In order to adjust the propeller to the various conditions of operation of the airplane, which differ to a great extent, according as the airplane is flying close to the ground or at a great height, in a straight horizontal line or along a climbing path, an adjusting device has been provided.

Figure 3:
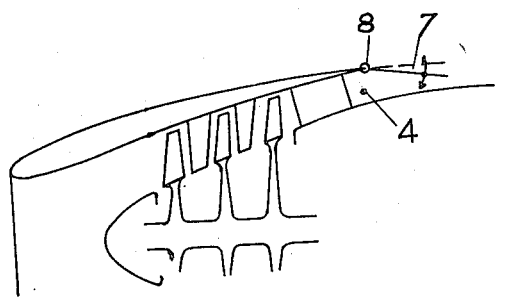

This device, which is shown by Fig. 3, consists of one or several shutters 7, pivoted about a spindle 8 and which permit, according to their angular position, of varying the section of the nozzle outlet. These shutters are controlled by the pilot through a suitable transmission; of course, the pilot adjusts the power of the engine in the ordinary way through the gas throttle, but, further, the operation of shutters 7 makes it possible for him to adjust the propelling system to all the conditions of operation as may occur.

In particular, the opening of the shutters will correspond to a greater power and their closing to a lower power for the same velocity of operation.

On the other hand, it is clear that, when the orifice of this nozzle is increased, the velocity of exhaust $v_2$ of the air decreases but the mass of air brought into play increases. This arrangement is advantageous for obtaining a high propulsion force with a good efficiency when the speed of the airplane is relatively low.

On the contrary, when the speed of the engine increases, the shutters 7 will be arranged in such a position as to decrease the area of the nozzle orifice, which increases the outflow velocity $v_2$, thus maintaining the efficiency at high speeds and thus makes it possible to obtain, for the airplane, a high impulse at high speeds.

Likewise, the operation of these shutters will make it possible to adjust the operation of the system when the height varies.

Of course, these shutters can be replaced by any known means for varying the section of nozzle 4.

Another device for adjusting the propeller, which can be used separately or in combination with that above described, consists in giving different angular positions to the blades of the compressor which, in this case, can be rather easily built in this way owing to the small weight of the blades and to their relatively low velocity, either simultaneously or not with a displacement of the stationary blades of said compressor. It is possible, through either of these means, or through the combination of both, to modify the characteristics of the compressor, for adapting it to the various working conditions.

In particular, it may be very advantageous to adapt the compressor to the working at great height in such manner that it utilises, at this time, the full power of the engine; but in this case, when the propeller is working on the ground level, the power absorbed by the compressor would be too great for the engine. In order to remedy this, we may vary the angular direction of the blades of one or several wheels so that the power it absorbs decreases or even becomes practically zero. Likewise, it is possible, either simultaneously or not with the above mentioned means, to vary the angular position of the blades of one or several of the stationary guide wheels so that, through the resulting modification of the relative direction of the air in the following wheels, the power it absorbs is reduced or even made practically zero.

Finally, it is also possible to reduce the power absorbed by the compressor by disconnecting one or several wheels which will then turn freely about their shaft and will absorb practically no power, or again by releasing one or several rows of stationary blades, so that this row then turns under the action of air.

This arrangement is shown by Fig. 3a. In this embodiment, the row of stationary blades mounted on wheel 65, placed between wheels 66 and 67, can, when left free to move, turn about the shaft, owing to the provision of ball bearings 68.

Under normal working conditions, this wheel 65 is locked with respect to the body of the compressor, by means for instance of an external disc 69 which can be tightly held between two annular elements 70 and 71 or in any other releasable manner.

When disc 69 is released, by moving discs 70 and 71 away from each other, wheel 65 starts turning on its ball bearing under the effect of the air flowing through the compressor and it assumes a velocity such that the whole of the two wheels 66 and 67 now produces only a work corresponding to a single one. This arrangement, which is easy to build, is particularly advantageous.

Figure 4:
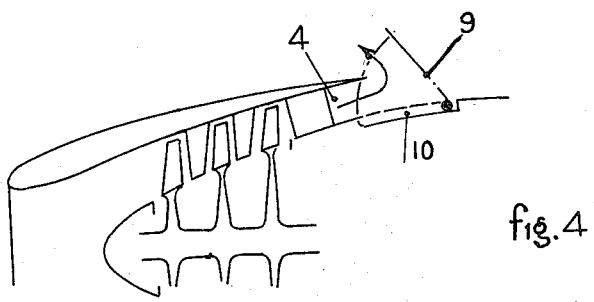

It is also very advantageous, for an airplane flying at high speed, to be able to produce a true braking action of said airplane. The propelling system according to the invention makes it possible easily to obtain this braking by means of the arrangement shown by Fig. 4.

This arrangement consists of a shutter 9 which in normal flying position is retracted along the edge of nozzle or on the outside of the jet of fluid issuing from said nozzle, so as to produce no detrimental resistance. For instance, this shutter may be, in this case, retracted in a housing 10.

When the pilot desires to produce a braking of the airplane, it brings shutter 9, through any suitable control means, into a position such as that shown by the drawing.

It will be readily understood that, in this position, the jet of air issuing from nozzle 4 is deflected toward the front and discharged into the atmosphere in a frontward direction and with a very high velocity. Instead of being directed in the direction in which the airplane is travelling, the thrust produced by the reaction of the turbine is then directed in the opposite direction and consequently produces a braking effect which may be of great intensity. This arrangement may be advantageous, for instance, in the case of fighting planes and also to facilitate the landing of all airplanes. It will be noted that this arrangement gives, in opposition to the known braking devices making use of flaps, a braking action which does not tend toward zero when the speed of the engine becomes zero. Furthermore, such a braking arrangement eventually permits of leaving the engine in full power running operation while braking it or keeping it stationary (when on the ground, or when landing or during a fight, in order temporarily to remain behind a slower plane and at good range with respect thereto).

On the other hand, it is possible to increase the useful work produced by the nozzle by heating the air after it has been compressed and before it is expanded in said nozzle. It is known that, under a given pressure, the rate of flow of air through a nozzle is the higher as its temperature is higher. On the other hand, it has been above explained that the thrust of the propelling device increases together with the outflow velocity of air. Therefore, if, without changing any other condition of working of the propelling device, the gases are heated before they pass through nozzle 4, the thrust, and therefore the useful power of the propelling system is increased.

First of all, it is possible to produce this heating without any supplementary consumption of fuel, by sending the exhaust gases of the engine into the air flow before the latter passes through the nozzle.

Figure 5:
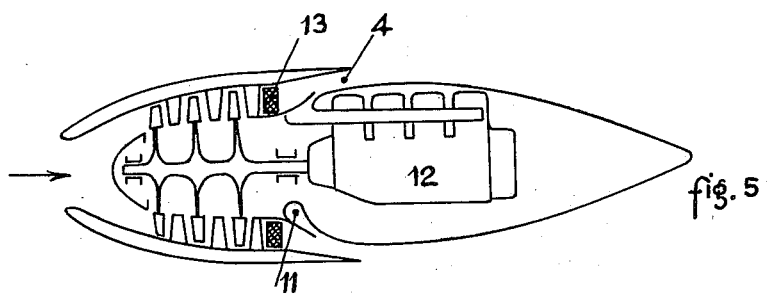

It is also possible to place, at this point, and before the exhaust, the radiators which serve to the cooling of the water circulating in the engine and eventually of the lubricating oil. We incorporate to the air, in order to obtain a good utilization, all the calories which, otherwise, would be lost through the exhaust and by the cooling of the engine. Such an arrangement is shown by Fig. 5.

In this embodiment, 12 is the engine and 13 designates the radiators for the cooling of the engine water and oil.

The exhaust gases from engine 12 are led to a main 11 which, in this case, has been shown in the form of a tore, but which might be of any other shape. From this main, these gases escape to mix with the compressed air.

In order to avoid creating a supplementary resistance to the flow of air and a counterpressure on the exhaust, it is preferable to produce the mixture of the gaseous streams through means such that the velocities of the air and the gases are substantially in the same direction.

However, within the scope of the invention, this mixing can be made in any suitable manner.

It would also be advantageous, in some cases, to divide the exhaust main into two or more elements, each of these elements receiving the exhaust from one cylinder or one group of cylinders chosen in such manner that their exhaust into a common chamber do not interfere with one another.

It is also possible, in order to utilize the whole of the heat given off to the outside by the engine, to place said engine, or at least the cylinders thereof, in the air jet itself before the passage of said jet through nozzle 4. This arrangement is particularly advantageous in the case of air cooled engines because, in this way, the cooling of the engine is perfectly ensured and all the calories thus given off by the engine are incorporated to the air for raising the temperature thereof and increasing its useful work.

Figure 6:
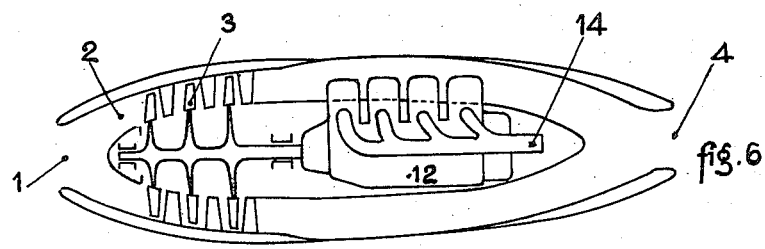

Fig. 6 shows this arrangement in the case of an engine having its cylinders disposed along one or several lines or rows. In this drawing, the exhaust gases from the engine mix at 14 with the compressed air before the passage of said air through nozzle 4.

Figure 7:
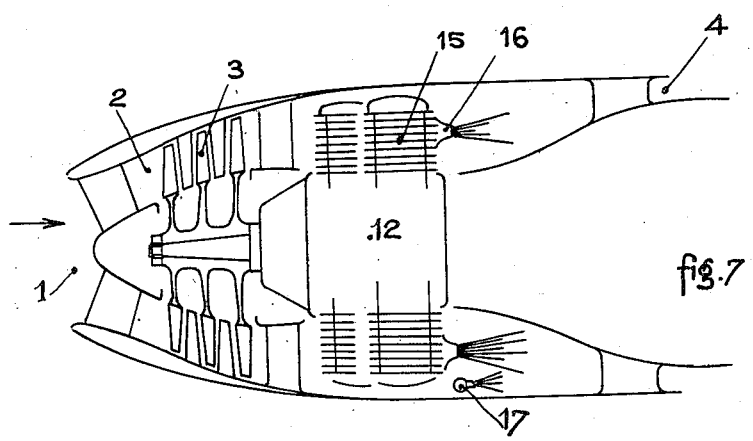

Fig. 7 shows the same arrangement in the case of a radial engine, this type of engine being particularly well adapted to a combination of this kind.

In this drawing, the cylinders 15 of the engine are bathed in the air leaving the propeller and their exhaust gases escape directly into this air through nozzles 16.

When it is further desired to increase the thrust of the propelling device, it is possible to raise the temperature of the air by means of a supplementary heating, which may be constituted for instance by one or several burners 17 to which a supplementary amount of fuel is fed. These burners are preferably distributed in the air stream so as to produce a temperature as evenly distributed as possible. Such an arrangement has the disadvantage of necessitating a supplementary consumption of fuel which is not utilized with a very good efficiency and, consequently, the total efficiency of the system is somewhat reduced during the periods for which the supplementary burners are utilized. However, this arrangement has the very considerable advantage of permitting the obtainment of an excess of power, which is advantageous when this excess of power is necessary only for a short period, for instance for taking off, for climbing, or while the airplane is engaged in a fight. In this case, the consumption of fuel is of little importance since it lasts for a very short time. This method, which can be applied whatever be the type of means used for driving the propeller, has the very great advantage of being paid neither by a substantial increase of the weight of the airplane nor by any reduction of the efficiency of the motor means and the propeller when running under normal power conditions.

Figure 8:
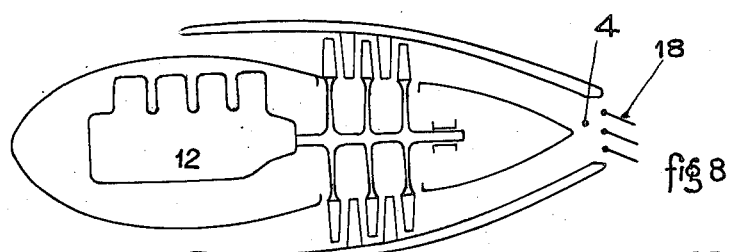

The detail arrangements shown by the above mentioned drawings have been chosen by way of example in order to permit of explaining the operation of the propeller, but modifications might be made thereto without for this reason departing from the principle of the invention. For instance, Fig. 8 shows a modification in which the engine is placed ahead of the propeller.

In addition to the advantages already set forth concerning the propeller, and to which must be added the high efficiency of the whole, especially in the case of the calories from the exhaust gases and from the cooling of the engine being recuperated, which permits of providing propelling systems the apparent efficiency of which may be as high as, and even higher than 1, the invention permits of obtaining a certain number of devices which are of very high interest for the handling and operation of the airplane in flight.

Among these devices, the chief are the following:

First, the reaction nozzle 4 may be provided with deflecting shutters or flaps 18 (Fig. 8) the angular position of which is controlled by the pilot. These flaps permit of directing at will the air jet leaving the nozzle and therefore of giving any desired direction to the thrust produced by said jet. It follows that a high transverse force can thus be applied to the airplane, which permits of taking sharp turns for instance and ensures a great facility of manoeuvre comparable to that obtained with pivotable propellers in the case of boats.

It goes without saying that deflectors 18 may be provided either for varying the direction of the thrust in the horizontal direction or in the vertical plane or in both.

It is also possible to vary the direction of the outflowing gases by displacing the whole of the propeller owing to a suitable suspension thereof adapted to permit of pivoting it with respect to its normal position.

Such an arrangement should be employed preferably to the shutters or in combination therewith when it is desired to have, for relatively long periods, a direction of the jet making a certain angle with the direction in which the airplane is travelling. For instance, it may be interesting to increase the lift of the airplane by directing in a slightly downward line the air jet from the propeller nozzle. As a matter of fact, the vertical component which results therefrom may be very substantial in comparison with the weight of the airplane, and add itself to the lift of the wings.

This property can be utilized, even when the propeller is not pivotable with respect to the airplane, by giving the outlet of the nozzle a slight downward direction. This direction will depend upon the aerodynamic qualities of the airplane and the section of the wings and the optimum direction will generally differ little from the direction of the wing trailing edge.

Figure 9:
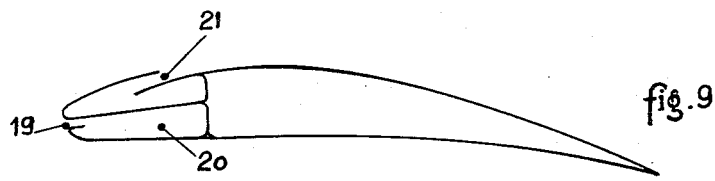
Figs. 9, 9a and 10 are transverse sectional views of an improved airplane wing made according to different features of the present invention, respectively.

As the working of the propeller calls for the suction, from the atmosphere, of a great amount of air, we may take advantage of this for reducing as much as possible the drag of the airplane, by drawing in this air from the points where the surface of the airplane exerts the higher head resistance, for instance along the leading edge of the wing. Fig. 9 shows this arrangement.

Air is admitted along a slot 19 disposed over the whole or a part of the length of the wing and thus penetrates into a channel 20 which leads this air to the inlet of the propelling system. Directing blades may be provided between the slot and the channel or in this channel, so as to reduce as much as possible the resistance of the air circuit.

We may also dispose the discharge nozzles of the propelling system in a position such that they produce an increase of the wing lift. For instance, these nozzles may open along a narrow slot 21 (Fig. 9) running along the whole or a part of the wing span, so as to blow away the limit layer or stratum where it tends to accumulate, which thus produces a lift increase analogous to that obtained by means of a slotted wing but which can be much more important because the available blowing pressure is substantially higher.

The blowing of the limit layer, instead of being made along a single line, can also be made along several lines, in such manner as to avoid, over the whole area of the wing, the accumulation of the limit layer, even for very high angles of incidence of the wing, which makes it possible to obtain a very high lift increase, so that the airplane can be considerably reduced without danger, for instance when taking off or landing.

Figure 9A:
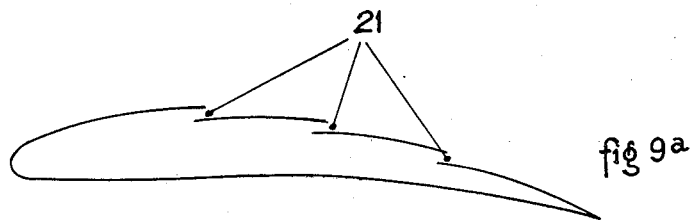

Such an arrangement is shown by Fig. 9a.

Figure 10:
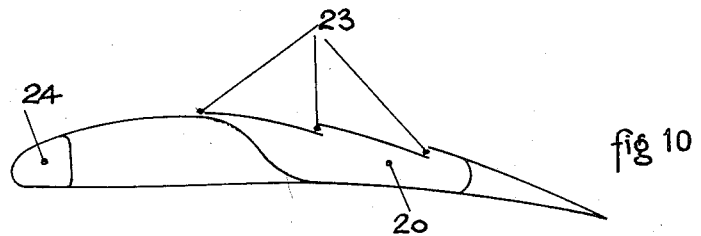

Instead of blowing away the limit layer by means of the exhaust of the propelling system, we may also suck it by means of one or several slots provided along the span of the wing and extending over the whole or a part thereof. Such an arrangement is illustrated by Fig. 10. Slots 23 permit of admitting the air into a chamber 20 connected to the inlet of the propelling system.

Finally, according to another arrangement, we send a portion of the exhaust fluid from the propeller into a conduit 24 (Fig. 10) placed along the leading edge of the wing, so as to heat it to avoid freezing thereon. The gases thus utilized escape to the atmosphere through small nozzles working in the same conditions as the main nozzles, and adding their propelling action to that of the whole. Thus the removal of ice on the wings is obtained without loss of efficiency.

These nozzles can also be constituted by slots placed at the wing tips and producing, at these points, a lift increase effect and the desired thrust.

In the preceding description, it has been supposed that the propeller proper is driven by an ordinary engine of the reciprocating type, such for instance as a gasoline engine or a Diesel engine. But this propeller can also, according to the invention, be driven by a motor of any other type, for instance a gas turbine, and, in this case, very interesting combinations can be devised.

Figure 11:
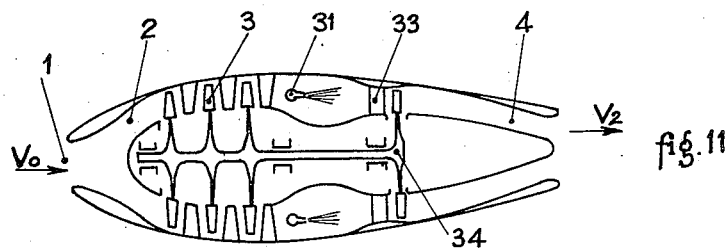

Fig. 11 shows a propeller driven by a gas turbine.

The air admitted through the inlet orifice is slowed down in the divergent inlet 2, then compressed by propeller 3, which may be of a monocellular or multi-cellular type. In this embodiment, the compressor is shown as including three compression stages, with helicoidal blades and stationary intermediate guiding blades.

When leaving the compressor, the air is heated by one or several burners 31 disposed in one or several combustion chambers. In the embodiment illustrated by the drawing, the combustion chamber 32 is of annular shape and includes a plurality of small burners distributed at equal intervals around its center. When issuing from the combustion chamber, the compressed air is expanded in the nozzles 23 of turbine 34.

When issuing from the turbine, the air expands again in the propulsion nozzle 4, in such manner as to assume a high speed $v_2$ as necessary for ensuring the propulsion of the aircraft. This nozzle may be, as above, provided with shutters for adjusting the outlet section thereof, and also with adjustable deflecting shutters.

It is also possible, by suitably adapting the turbine, to dispense from the second expansion nozzle 4. It suffices, for this purpose (Fig. 11 bis) to provide the turbine in such manner that the gases have, at the outlet from the movable wheel, a high residual velocity, of a substantially aixal direction. This result is obtained by giving nozzles 33, same as the set of blades 35 of the removable wheel, sections with very open angles. In this way, the full expansion of the gases takes place in nozzle 33, a portion of the energy being utilized in wheel 35 and the remainder serving to the propulsion.

When the propeller is driven by a gas turbine, the temperature of the gases issuing therefrom is relatively high and if they are sent directly into the atmosphere, the efficiency may be relatively low in view of the loss of the calories thus evacuated into the atmosphere.

In order to improve the efficiency, it is possible, before expanding the gases, to mix them with a certain amount of air having analogous pressure and velocity. In this way, we reduce the temperature of the mixture delivered into the atmosphere, while increasing the fluid mass. This involves an improvement of the efficiency.

Figure 12:
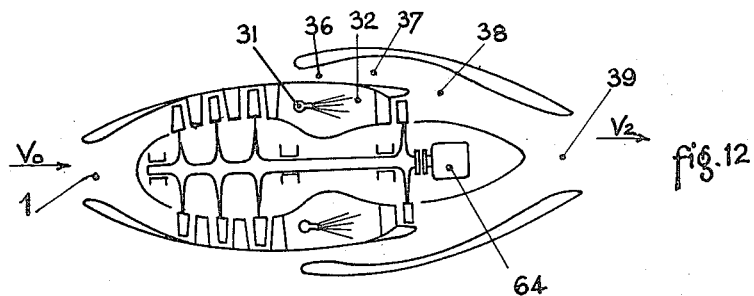

Fig. 12 shows an arrangement in which the air to be mixed with the exhaust gases from the turbine is admitted directly through orifices 36 and compressed merely by its passage through divergent inlet 37.

After mixture at 38 with the exhaust gases from the turbine, the whole expands in nozzle 39 before escaping into the atmosphere with velocity $v_2$. It is clear that this arrangement can be employed only when the expansion ratio in nozzle 39 is relatively low.

In order to obviate this drawback, the heating of the cold air may be effected by means of a surface heater or thermic interchanger, which permits of avoiding mixing said air with the combustion gases issuing from the turbine.

It is also possible, since in this case the gases may have different pressures, to place this interchanger, suitably streamlined, in the hot gas jet after their expansion in nozzle 39.

Figure 13:
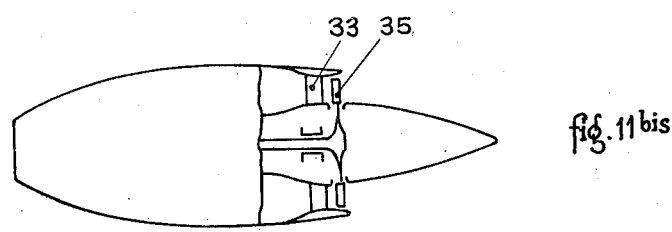
Figure 13:
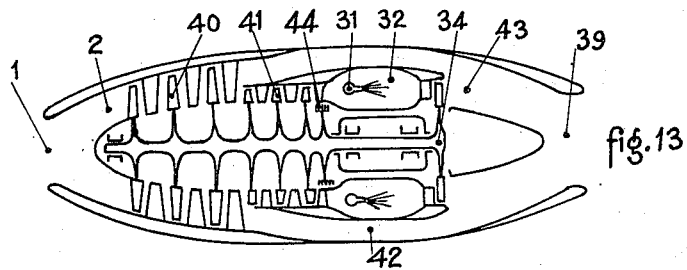

However, when it is desired to utilize higher expansion ratios, it is necessary to have recourse to an arrangement analogous to that illustrated by Fig. 13.

In this embodiment, the air issuing from propeller 40 is divided into two portions, one of which is further compressed by compressor 41, goes to the combustion chamber shown at 32, where it is heated by burner 31, then expands in gas turbine 34, which is shown of the monocellular type, but which might also include several stages.

The other portion of the air issuing from compressor 40 passes through a direct conduit 42 which constitutes a by-pass from the gas turbine. Compressor 41 and turbine 34 are devised in such manner that the pressure and velocity of the air and gas which meet together at 43 are substantially equal, whereby the mixture is obtained without loss of energy due to eddies.

The gases at high temperature issuing from the turbine heat the relatively cold air coming from the by-pass and the whole is then expanded in nozzle 39, so as to acquire the high speed that is necessary for propulsion.

This arrangement has several advantages. In particular, it is possible, without any drawback, to raise the temperature of the gases produced in the combustion chamber 32 in such manner to improve the efficiency of the gas turbine, and the excessive temperature which results therefrom at the outlet is corrected by suitably increasing the proportion of air passing through the by-pass. On the other hand, the heat lost in the combustion chamber toward the outside is recuperated in by-pass 42, where it cooperates to the heating of the air. It is possible to arrange that the air flowing through the unavoidable leak which exists around the balancing piston 44 of the compressor sweeps the remainder of the surface of the combustion chamber, so that the whole of the lost heat is recuperated. This air may subsequently be returned to the mixing chamber 43, for instance by flowing through the wheel of the turbine at the lower part of the blades, which will have been devised for this purpose.

In Fig. 13, the propeller has been shown in the form of the first stages of a multi-cellular compressor the last stages of which compress only the air portion intended for the turbine, these two parts of the compressor being keyed on the same shaft. But, in view of the different air volumes acted upon by these two parts of the compressor, and also of the different pressures that it is necessary to obtain, it may be advantageous to make the compressor of two distinct bodies turning at different speeds. Such an arrangement is shown by Fig. 14.

Figure 14:
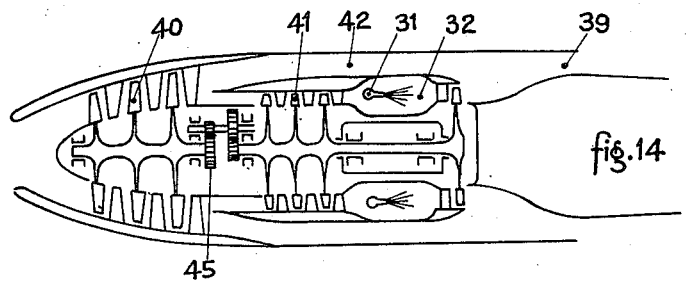

The embodiment illustrated by Fig. 14 differs from the preceding one in that compressor 41 which feeds air to the gas turbine is directly driven by said turbine, these two machines being keyed on the same shaft, while propeller 40 which, according to the very principle of the invention, is to rotate at relatively low speed, is driven through a speed reducing gear 45. This gear has been shown in the form of a system of pinions but it might be made of any other form, either conventional or not.

It will be readily understood that, in order to obtain the correct adaptation, both of the propeller and of the compressor of the turbine, when the power, the speed and the height of the airplane vary, it may be necessary to vary the ratio of the outputs supplied by those two machines. This variation can be obtained with machines the speeds of which are always in the same ratio with respect to each other, but it involves a difficulty of the adaptation of the point of operation of each of the machines. This drawback can be obviated by making use of compressors the movable or stationary blades of which can be adjusted and angularly displaced, or having wheels which can be left free to rotate loose on the shaft or sets of stationary blades which can be allowed to turn with the wheels, but it is more advantageous to control the propeller and the compressor so that they run at speeds independent from one another to a certain extent.

Figure 15:
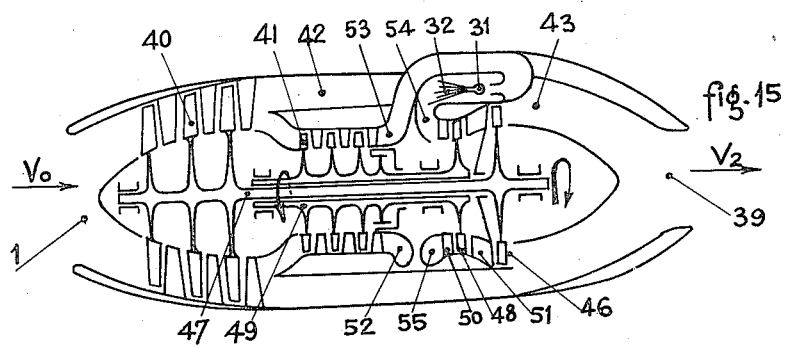

This result can be obtained with the arrangement shown by Fig. 15, in which propeller 40 is driven by turbine wheel 46 through shaft 47, while compressor 41 is driven by turbine wheel 48 through hollow shaft 49 concentric to shaft 47. In this arrangement, the gas turbine includes two stages 48 and 46, each of which may be of the single cell or multiple cell type, and through which the gases coming from combustion chamber 32 flow in series.

A particularly advantageous arrangement consists in making use of two turbine wheels 48 and 46 rotating in opposite directions and employing the kinetic energy of the gases expanded in the nozzles 50 located immediately ahead of the first wheel, a slight supplementary expansion being eventually effected in the set of stationary guiding blades 51 which is located between the two wheels.

With this arrangement, the efficiency of the turbine can be particularly high because the loss due to the change of direction of the driving fluid in set of blades 51 is greatly reduced. It is even possible to arrange so that the deviation to be effected between the two wheels is practically zero and element 51 can then be wholly dispensed with.

In this drawing, the air issuing from compressor 41 is received in a tore-shaped conduit 52 which communicates, through pipe 53, with combustion chamber 32, whence, after heating by burner 31, it is brought, through conduit 54, to tore-shaped element 55, which feeds it to the nozzles of the gas turbine.

Instead of a single combustion chamber, it is possible to make use of several chambers, for instance three, which may then be evenly distributed around the axis of the machine, each including the pipes 53 and 54 for the air inflow and the gas outflow and eventually further including one or several burners.

The portion of the air which does not pass through the gas turbine is derived through by-pass 42 and is added, in mixing chamber 43, to the exhaust gases of the turbine, which heat this air. The gaseous mixture is then expanded in nozzle 39 before being evacuated to the atmosphere.

In the case of the propeller being driven by a gas turbine, it is clear that it is also possible, as above stated, to heat the air flowing through the by-pass by means of one or several burners into which a supplementary amount of fuel is sent, in order to be able to obtain temporarily a higher power while slightly lowering the efficiency during this period.

Of course, nozzle 39, same as inlet orifice 1, can be divided in such manner as to constitute several nozzles working in parallel and of any suitable shape or section. For instance, the nozzles may be of circular or rectangular section or of very flat shape. They may be provided either at the rear or on the sides of the engine nacelles or of the fuselage or of the wings, several of these arrangements having been indicated above by way of example.

Likewise, in the propeller driven by a gas turbine, the movable and stationary blades of the propeller and of the compressor can be adapted to be angularly displaced, either for the whole of the machine or by wheels or groups of wheels, as indicated for the case of propellers driven by ordinary reciprocation movement engines.

The starting of propelling systems including an engine of this last mentioned type involves no difficulty other than those indicated for operation on the ground level in the case of the system being adapted to working at high altitude. Concerning the case of propellers driven by gas turbines, a special device or method must be provided for starting the system. Such a device is easy to provide. For instance, we provide a small starting engine (as shown at 64 in Fig. 12) driving the gas turbine for starting it and adapted to be subsequently disconnected.

We may also send into the combustion chamber air coming from a battery of compressed air bottles and suitably expanded. This air is then heated by the burners which are thus allowed to start burning and it permits the starting of the gas turbine and therefore that of its compressor. At this time, we might dispense with the compressed air bottles, which might be left on the ground, the airplane being kept stationary during the starting of the turbine-compressor unit.

Another solution, which has great advantages of simplicity and quickness, consists in effecting the starting of the propeller by blowing through orifice I compressed air from a motor-fan system placed on a motor car and provided with a flexible or angularly displacement pipe adapted to fit on inlet I, the airplane being kept stationary during operation.

The air flow thus produced in the propelling system permits of starting burners 31 and the gas turbine which then supplies the power necessary for the drive of the compressor or compressors. The acceleration of this turbine is then easily and quickly obtained by the adjustment of the amount of fuel and the motor car carrying the auxiliary fan can then move away so as to permit the take off of the airplane.

We may also constitute a mixed propelling system including both a reciprocating movement engine and a gas turbine.

Figure 16:
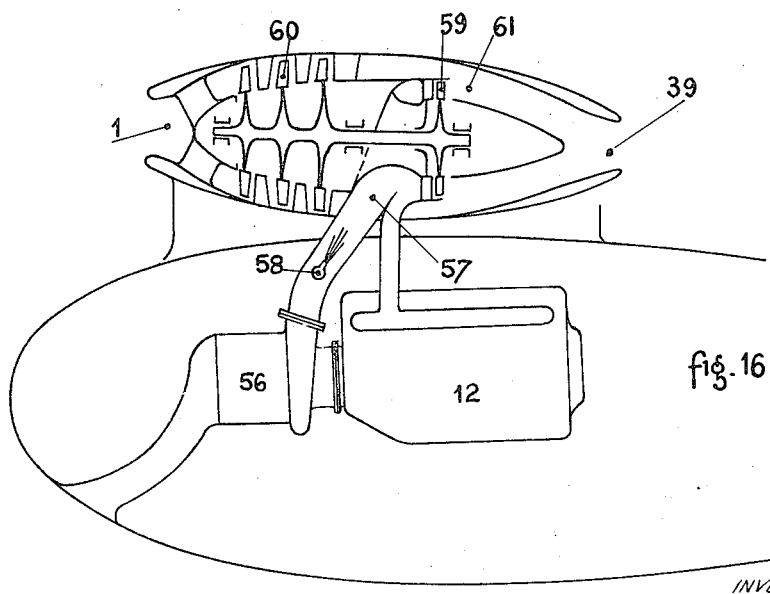

Fig. 16 shows an arrangement of this kind. In this drawing, the reciprocating motion engine 12 drives compressor 56, which discharges air to the combustion chamber 57, where air is heated by burner 58. This combustion chamber may also receive the exhaust gases from engine 12, which may itself be supercharged by a portion of the air supplied by compressor 56.

The hot gases coming from combustion chamber 57 are sent to gas turbine 59 which, owing to the heating of the gases, is capable of supplying a power substantially higher than that of engine 12. This turbine in turn drives compressor 60, according to the invention.

The air from the atmosphere which penetrates through orifice I is compressed by propeller 60, mixes at 61 with the exhaust gases from the turbine and the whole is expanded by nozzle 39 before being evacuated to the atmosphere for propelling the airplane. This arrangement is particularly advantageous for instance in the case of a twin engined airplane in which the reciprocating motion engine or engines 12, which must be supervised, can be placed in an accessible portion of the airplane, for instance in the fuselage, while the propellers proper can be placed on the outside, either in separate nacelles or in the thickness of the wings.

Besides, it should be noted that the various types of propelling systems above described are particularly well adapted to the most varied embodiments of airplanes and can be employed either in the fuselage or in separate nacelles, or again in the thickness of the wings or ahead of them.

By way of example, Figs. 17 and 18 show, in vertical section and in plan view respectively, a four-engined airplane of the type called "flying wing," in which the four propelling system 61 are placed so as to project slightly at the front of the wing and each discharge fluid streams through a slot-shaped nozzle located on the upper side of the wing at the point where an accumulation of the limit layer tends to occur.

The four nozzles thus constituted are of a size such that they adjoin one another so as to create over the whole span of the wing, a lift increase device acting by blowing off the limit layer, in addition to the desired thrust.

In Fig. 17, I is the inlet orifice leading to propeller 40, 62 designates one of the four engines driving the propellers, 63 is the slot-shaped nozzle for the expansion of the gases in order to obtain propulsion.

In a general manner, while we have disclosed what we deem to be practical embodiments of the invention, it should be understood that we do not wish to be limited thereto as there might be changes made therein without departing from the principle of the present invention as comprehended within the scope of the appended claims.

What we claim is:

1. A propelling system for an aircraft which comprises, in combination, a tunnel-like casing extending in the fore-and-aft direction of said aircraft, a compressor in said casing, including at least two stages in series, a divergent air inlet at the front end of said casing for slowing down the velocity of the inflowing air on its way from the atmosphere toward said compressor, a gas turbine in said casing mechanically coupled with said compressor for driving it, extraneous means for heating at least a portion of the air delivered by said compressor, means for leading said heated air to the intake of said turbine, a reaction nozzle at the rear end of said casing for expanding the fluid from said turbine and discharging it into the atmosphere in the rearward direction with an increased velocity, and means for by-passing air from said compressor between said two compression stages thereof, and mixing said by-passed air with the gases issuing from said turbine and proceeding to said nozzle.

2. A propelling system for an aircraft which comprises, in combination, a tunnel-like casing extending in the fore-and-aft direction of said aircraft, a compressor in said casing, a divergent inlet at the forward end of said casing for slowing down the velocity of the inflowing air on its way to said compressor, motor means including a gas turbine drivingly coupled to said compressor and an internal combustion engine arranged to feed hot gases under pressure to the intake of said turbine for operating said turbine, and means for expanding the fluid issuing from said compressor and discharging it from said casing into the atmosphere in the rearward direction with an increased velocity, the divergence of said inlet and the rotational speed of said compressor being such that the peripheral velocity of the compressor relative to the air is always less than the velocity of sound, even at excessively high flight speeds.

3. A propelling system for an aircraft which comprises in combination, a tunnel-like casing extending in the fore-and-aft direction of said aircraft, a compressor in said casing, including at least two stages in series, a divergent air inlet at the front end of said casing for slowing down the velocity of the inflowing air on its way from the atmosphere toward said compressor, a gas turbine in said casing including at least two stages in series, means mechanically coupling the first compressor stage with the second turbine stage, means mechanically connecting the second compressor stage with the first turbine stage, whereby the first and second turbine stages drive the second and first compressor stages, respectively, extraneous means for heating at least a portion of the air delivered by said compressor, means for leading said heated air to the intake of said turbine, a reaction nozzle at the rear end of said casing for expanding the gas from said turbine and discharging it into the atmosphere in the rearward direction with an increased velocity, and means for by-passing air from said compressor between the two stages thereof, and mixing the by-passed air with the gases issuing from said turbine and proceding to said nozzle.

4. A propelling system for an aircraft, according to claim 3, wherein the first and second turbine stages turn in opposite directions whereby the first and second compressor stages are turned in opposite directions.

RENÉ ANXIONNAZ.
ROGER IMBERT.